United States Patent [19]
Lee et al.

[11] Patent Number: 6,078,555
[45] Date of Patent: Jun. 20, 2000

[54] OPTICAL HEAD ASSEMBLY HAVING COMPATIBILITY WITH DIGITAL VERSATILE DISK (DVD) AND A RECORDABLE COMPACT DISK (CD-R) AND FOR OBTAINING A HIGH-SPEED ACCESS TIME

[75] Inventors: Chul-Woo Lee; Jang-Hoon Yoo, both of Seoul, Rep. of Korea

[73] Assignee: Samsung Electronics Co., Ltd., Suwon, Rep. of Korea

[21] Appl. No.: 09/031,540

[22] Filed: Feb. 27, 1998

[30] Foreign Application Priority Data

Feb. 27, 1997 [KR] Rep. of Korea .......................... 97-6278

[51] Int. Cl.⁷ ...................................... G11B 7/09
[52] U.S. Cl. ................ 369/112; 369/94; 369/54; 369/44.37
[58] Field of Search ................. 369/54, 47, 48, 369/58, 59, 44.12, 44.14, 44.37, 44.38, 44.25, 112, 110, 94, 93

[56] References Cited

U.S. PATENT DOCUMENTS

| | | | |
|---|---|---|---|
| 5,278,813 | 1/1994 | Ohnishi et al. | 369/44.14 |
| 5,555,539 | 9/1996 | Kamisada et al. | 369/219 |
| 5,671,207 | 9/1997 | Park | 369/44.37 X |
| 5,748,602 | 5/1998 | Chao et al. | 369/110 X |
| 5,793,734 | 8/1998 | Tsuchiya et al. | 369/44.23 X |

FOREIGN PATENT DOCUMENTS

| | | |
|---|---|---|
| 60-133551 | 7/1985 | Japan . |
| 5-81698 | 4/1993 | Japan . |
| 6-20291 | 1/1994 | Japan . |
| 6-259804 | 9/1994 | Japan . |
| 6-325405 | 11/1994 | Japan . |
| 8-55363 | 2/1996 | Japan . |

OTHER PUBLICATIONS

Patent Abstracts of Japan, Miyairi Nobuo, Publication No. 03268240, Publication Date Nov. 28, 1991.
Patent Abstracts of Japan, Ito Masamichi, Publication No. 63282932, Publication Date Nov. 18, 1988.

*Primary Examiner*—Muhammad Edun
*Attorney, Agent, or Firm*—Staas & Halsey LLP

[57] ABSTRACT

An optical head assembly having compatibility with a recordable compact disk (CD-R) and a digital video disk (DVD) includes a stationary first optical unit and a second optical unit which moves to a position to change the target sector of an optical disk loaded in an optical disk driver on which the incident beam is irradiated by travelling between an inner circumference and an outer circumference of the loaded optical disk. The first optical unit directs an emitted first light beam having a wavelength of 635 nm for a DVD to the second optical unit and detects information contained in the first light beam redirected from the second optical unit, if the DVD is the loaded optical disk. Meanwhile, the second optical unit focuses the first light beam incident from the first optical unit if the loaded optical disk is the DVD and an emitted second light beam having a wavelength of 780 nm for a CD-R on an information recording surface of the loaded optical disk if the CD-R is the loaded optical disk, transmits the first light beam reflected by the loaded DVD disk to the first optical unit, and detects information from the second light beam reflected by the loaded CD-R disk.

28 Claims, 2 Drawing Sheets

OPTICAL HEAD ASSEMBLY HAVING COMPATIBILITY WITH DIGITAL VERSATILE DISK (DVD) AND A RECORDABLE COMPACT DISK (CD-R) AND FOR OBTAINING A HIGH-SPEED ACCESS TIME

BACKGROUND OF THE INVENTION

1. Field of the Invention

The present invention relates to an optical head assembly for use in an optical disk driver using light having wavelengths different from each other for at least two types of optical disks, and more particularly, to an optical head assembly for use in an optical disk driver which is compatible with a digital versatile disk (DVD) and a recordable compact disk (CD-R)

2. Description of the Related Art

In an optical disk apparatus using a recording medium for storing a large quantity of information, a compact disk (CD) and a digital versatile disk (DVD) have been widely used. Recently, a recordable compact disk (CD-R) and a digital versatile disk—random access memory (DVD-RAM) have been known. When reproducing information, laser light having a wavelength of 780 nm is used for a CD-R, and laser light having a wavelength of 650 nm or 635 nm is used for a DVD-RAM.

Accordingly, an optical disk driver which can record information on and reproduce information from these optical disks, includes at least two light sources for emitting laser light having different wavelengths from each other. Referring to FIG. 1, description on an optical system of an optical head for an optical disk driver which is compatible with a conventional DVD and a CD-R is as follows.

FIG. 1 shows a conventional optical head assembly for use in an optical disk driver for a digital versatile disk (DVD) and a recordable compact disk (CD-R). The optical head assembly includes a first light source 1 for emitting a first light beam having a wavelength of 635 nm for recording and reproducing information with respect to a digital versatile disk (DVD) 8, a second light source 11 for emitting a second light beam having a wavelength of 780 nm for recording and reproducing information with respect to a recordable compact disk (CD-R) 9, and an objective lens 7 for focusing the first and second light beams emitted from the first and second light sources 1 and 11 on an information recording surface of the DVD 8 and that of the CD-R 9, respectively.

The first light beam emitted from the first light source 1 is collimated in the form of a parallel beam by a first collimating lens 2 and then is transmitted to a first beam splitter 3. The first beam splitter 3 directs the first light beam incident from the first collimating lens 2 to an interference filtering prism 4, and transmits the first light beam returned from the interference filtering prism 4 to a first photodetector 10. In more detail, the first beam splitter 3 directs the first light beam, which is a P polarization beam incident from the first collimating lens 2, to the interference filtering prism 4, and transmits the first light beam which is an S polarization beam incident from the interference filter prism 4 to the first photodetector 10.

A variable aperture 6 having a thin film structure transmits the first light beam, which is a parallel light beam incident from a quarter-wave plate 5 to the objective lens 7. The objective lens 7 focuses the first light beam passed through the variable aperture 6 on an information recording surface of the DVD 8 having a thickness of 0.6 mm.

Therefore, the first light beam is focussed on the information recording surface of the DVD 8 by the objective lens 7, and the focussed first light beam reflected from the information recording surface of the DVD 8 contains the information recorded at a position on which the first light beam is focussed. The reflected first light beam passes through the objective lens 7, the variable aperture 6, the quarter-wave plate 5, the interference filter prism 4 and the first beam splitter 3, in sequence, and then is received by the first photodetector 10. The first photodetector 10 detects information from the first light beam incident from the first beam splitter 3.

The second light beam of the 780 nm wavelength which is emitted from the second light source 11 passes through a second collimating lens 12 and a second beam splitter 13, and then is incident to a convergent lens 14.

The convergent lens 14 converges the second light beam incident from the second beam splitter 13 to then transmit the converged second light beam to the interference filter prism 4. The interference filter prism 4, which totally transmits or reflects incident light according to a wavelength, totally transmits the first light beam for the DVD having a wavelength of 635 nm and totally reflects the second light beam having a wavelength of 780 nm incident from the convergent lens 14.

The interference filter prism 4 reflects the second light beam incident from the convergent lens 14 to the quarter-wave plate 5 in the form of a divergent beam. The quarter-wave plate 5 transmits the second light beam incident from the interference filter prism 4 to the variable aperture 6. The variable aperture 6 passes only part of the second light beam of the 780 nm wavelength incident in the form of a divergent beam. The objective lens 7 focuses the second light beam incident from the variable aperture 6 on the information recording surface of the CD-R 9 having a thickness of 1.2 mm. Thus, the second light beam is focussed on the information recording surface of the CD-R 9 by the objective lens 7, and the second light beam reflected by the information recording surface contains information recorded at a position on which the second light beam is focussed.

The second beam splitter 13 of FIG. 1 makes the second light beam incident from the convergent lens 14 proceed to a second photodetector 15. In more detail, the second beam splitter 13 totally transmits the second light beam incident from the second collimating lens 12 to the convergent lens 14, and totally reflects the second light beam incident from the convergent lens 14 to the second photodetector 15. The second photodetector 15 receives the second light beam from the second beam splitter 13 and detects information from the second light beam.

FIG. 2 shows in detail the variable aperture 6 shown in FIG. 1 having a thin film structure. The variable aperture 6 having a thin film structure, as shown in FIG. 2, can selectively transmit the rays of the light incident to the region not more than the numerical aperture (NA) of 0.6. Among two regions, a first region 1 has the numerical aperture (NA) of 0.45 or below and transmits both 780 nm and 635 nm wavelength lights. A second region 2 shown is made by coating a dielectric thin film and has the numerical aperture (NA) of 0.45 or more, and totally transmits the 635 nm wavelength light and totally reflects the 780 nm wavelength light. The region 1 is comprised of a quartz ($SiO_2$) thin film in order to remove any optical aberration generated by the dielectric thin film coated region 2. By using the variable aperture 6, the 780 nm wavelength light passing through the region 1 having the 0.45 NA or below forms a beam spot appropriate to the CD-R on the signal recording surface thereof. The 635 nm wavelength light transmitted through the regions 1 and 2 having the 0.6 NA or below forms a beam spot appropriate to the DVD on the signal recording surface thereof.

As shown, the optical head system of FIG. 1 can perform recording and reproduction operations with respect to both a DVD and a CD-R.

In the above optical head system, all optical systems for compatibility with the DVD and the CD-R are constructed as a single unit, and thus an actuator carrying the unit is imposed under more load. Accordingly, a data access time and a target sector seek time increase.

SUMMARY OF THE INVENTION

In order to solve the problems, an object of the present invention is to provide an optical head assembly reducing the load of an actuator by carrying only one of two optical units, which comprises an optical unit for recording and reproducing information to/from a digital versatile disk (DVD) and another optical unit for recording and reproducing information to/from a recordable compact disk (CD-R).

Additional objects and advantages of the invention will be set forth in part in the description which follows and, in part, will be obvious from the description, or may be learned by practice of the invention. To accomplish the above and other objects of the present invention, there is provided an optical head assembly for use in an optical disk driver using different wavelengths from each other for at least two types of optical disks, the optical head assembly comprising:

a first optical unit mounted fixedly in the optical head assembly; and a second optical unit mounted movably with respect to an optical disk loaded in the disk driver, wherein the first optical unit emits a first light beam having a first of the different wavelengths to the second optical unit and detects information from the first light beam reflected from the loaded optical disk and received from the second optical unit, if the loaded optical disk is a first of the at least two types of optical disks, and the second optical unit focuses the first light beam incident from the first optical unit on an information recording surface of the loaded optical disk and transmits the first light beam reflected from the loaded optical disk to the first optical unit, if the loaded optical disk is the first type of optical disk, generates a second light beam, focuses the second light beam on the information recording surface of the loaded optical disk and detects information from the second light beam reflected from the loaded optical disk, if the loaded optical disk is a second type of the at least two types of optical disks.

BRIEF DESCRIPTION OF THE DRAWINGS

These and other objects advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
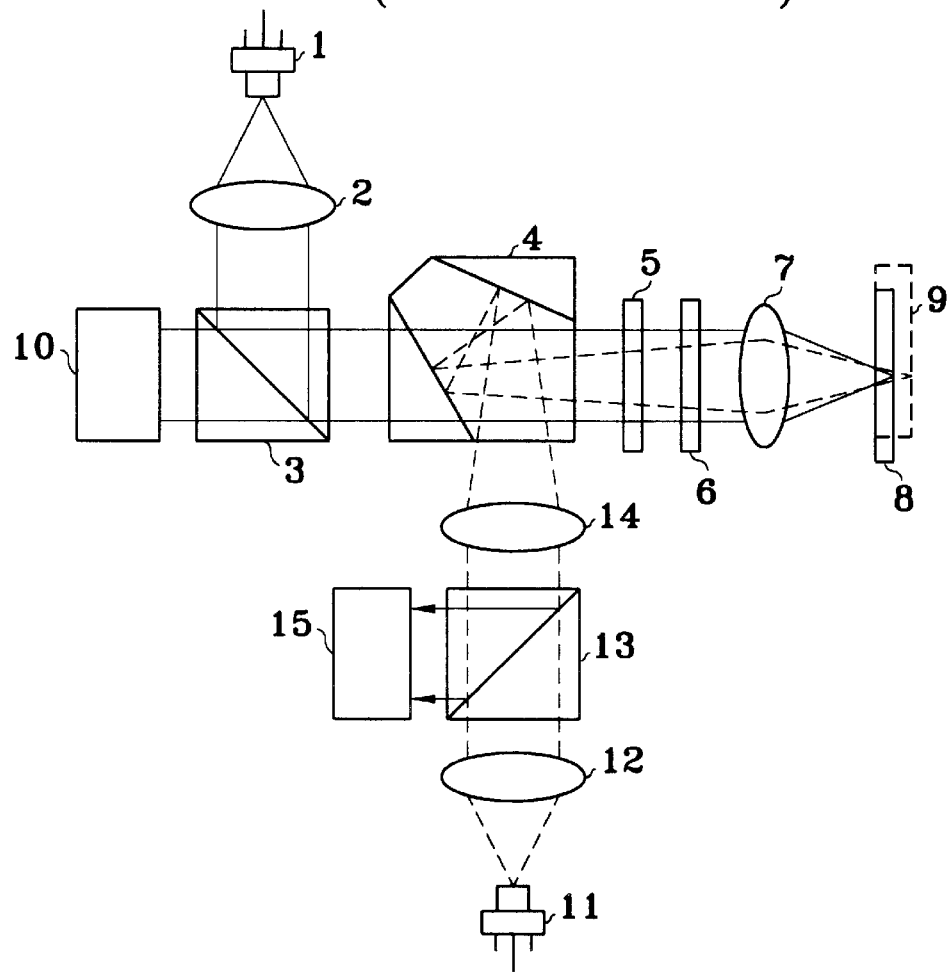
FIG. 1 is a view illustrating a conventional optical head assembly for use in an optical disk driver for a digital versatile disk (DVD) and a recordable compact disk (CD-R)
Figure 2:
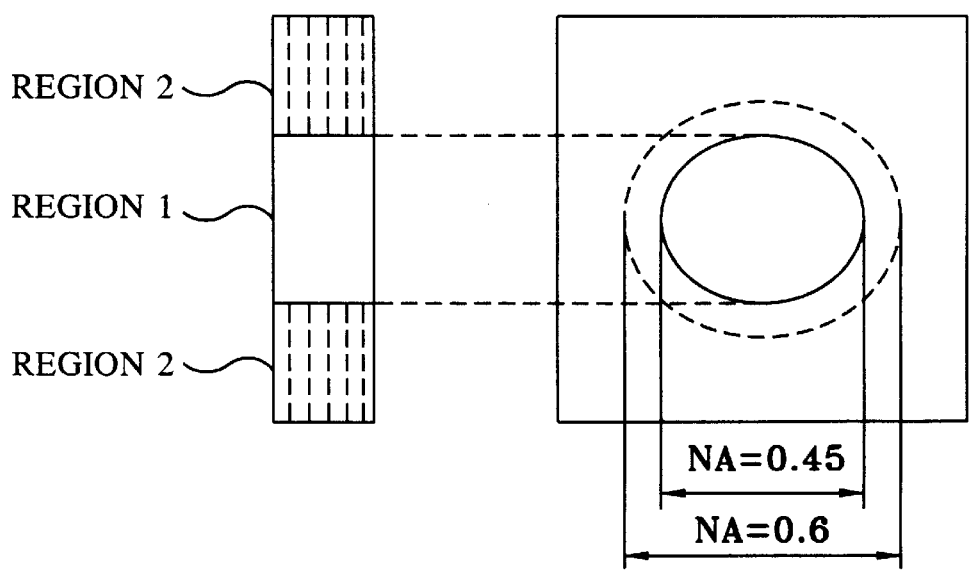
FIG. 2 is a view explaining a variable aperture having a thin film structure used in a conventional optical head assembly.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
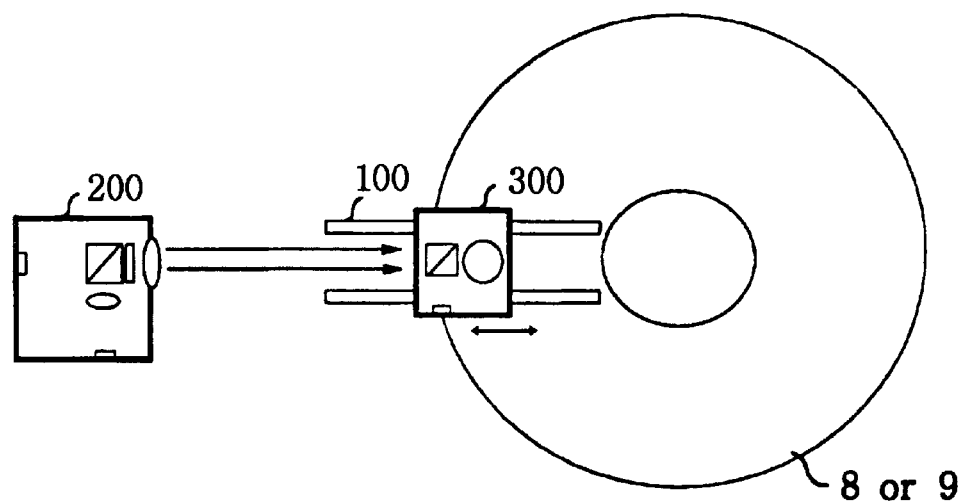
FIG. 3 is a view showing a mechanical construction of an optical head assembly for use in an optical disk driver for a DVD and a CD-R according to an embodiment of the present invention.

FIG. 3 is a view showing a mechanical construction of an optical head assembly for a DVD and a CD-R according to an embodiment of the present invention.

The optical head assembly shown in FIG. 3 includes a stationary first optical unit 200 and a movable second optical unit 300. The first optical unit 200 is fixedly mounted considering a location of the second optical unit 300 so that the second movable optical unit 300 can receive a first light beam for a DVD emitted from the first optical unit 200. The second optical unit 300 moves at a high speed on a guide rail which is installed along the diameter direction of an optical disk 8 (DVD) or (CD) 9 loaded within an optical disk driver (not shown), and focuses the first and second light beams on the information surface of the loaded optical disk, according to the type of loaded optical disk.

Figure 4:
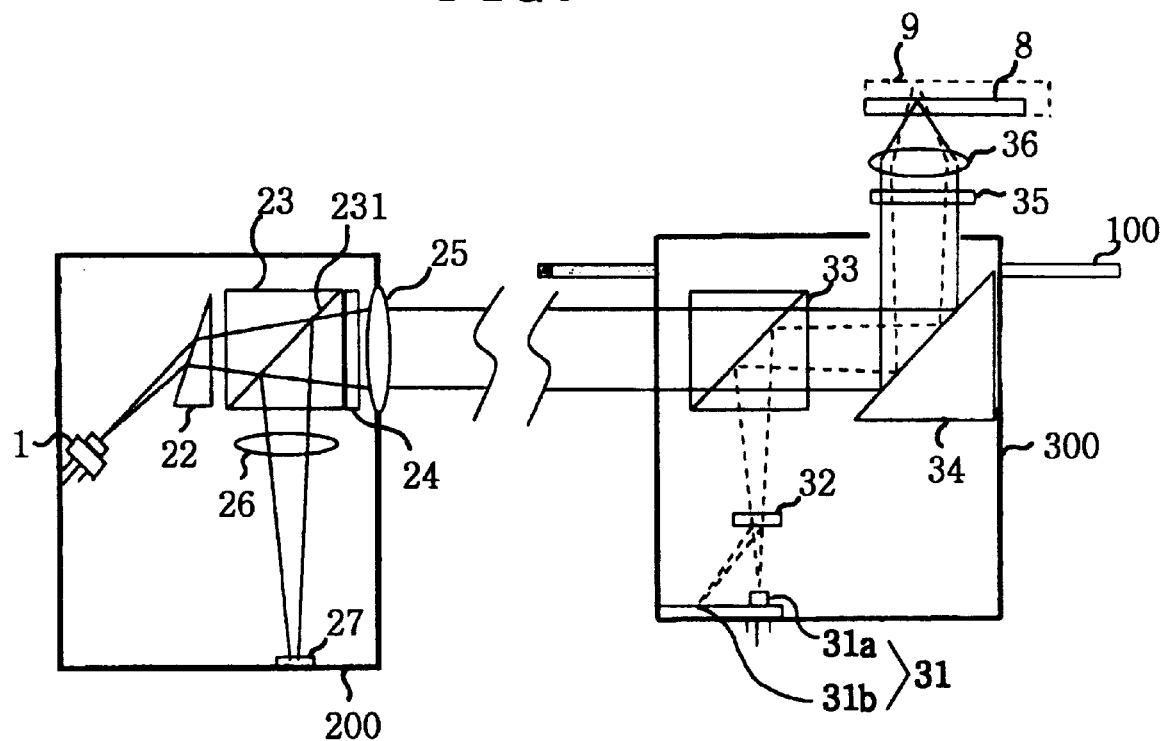
FIG. 4 is a view illustrating an optical head assembly for use in an optical disk driver for a DVD and a CD-R according to the embodiment of the present invention.

FIG. 4 shows the optical system of an optical head assembly shown in FIG. 3. The first optical unit 200 includes a first light source 1 for emitting a first light beam having a wavelength of 635 nm for the DVD 8, a beam forming prism 22 for transmitting the first light beam to the second optical unit 300, a first beam splitter 23, a phase plate 24, a collimating lens 25, a photodetection lens 26 for detecting information from the first light beam incident from the second optical unit 300, and a first photodetector 27.

The first light source 1 emits the first light beam which is a linearly polarized beam having a wavelength of 635 nm. For the convenience of description, the first light beam emitted from the first light source 1 defines a P polarization beam. The beam forming prism 22 performs beam-formation so that the first light beam incident from the first light source 1 has a desired beam cross-section. The first beam splitter 23 and phase plate 24 direct the first light beam emitted from the beam forming prism 22 to the second optical unit 300, and makes the first light beam returned from the second optical unit 300 proceed to the first photodetector 27. In more detail, the first beam splitter 23, including a reflection surface 231 which totally reflects the first light beam which is changed into an S polarization beam by the phase plate 24 before being incident and totally transmits the first light beam which is a P polarization beam incident from the beam forming prism 22, splits the light beam to form another optical path according to a polarization state of the first light beam. The phase plate 24 changes the first light beam incident from the second optical unit 300 into an S polarization beam.

The collimating lens 25 collimates the first light beam incident from the phase plate 24 and transmits the collimated light beam to the second optical unit 300. The first light beam proceeding from the first optical unit 200 to the second optical unit 300 by such a collimating lens 25 does not produce an optical aberration, even when a relative difference in distance occurs between the first optical unit 200 and the second optical unit 300.

The second optical unit 300 which is an optical unit for recording and reproducing the CD-R 9, comprises a light source and photodetector 31 in which a light source 31*a* and a photodetector 31*b* are integrated, a holographic beam splitter 32, a second beam splitter 33, a reflective prism 34, a holographic variable aperture 35 and an objective lens 36.

The light source 31*a* generates a second light beam having a wavelength of 780 nm for recording and reproduction of the CD-R 9, and the photodetector 31*b* detects information from the second light beam incident from the holographic beam splitter 32. The second beam splitter 33 transmits the first light beam incident from the first optical unit 200 to the reflective prism 34, directs the first light beam returned from the reflective prism 34 to the first optical unit 200, transmits the second light beam incident from the holographic beam splitter 32 to the reflective prism 34, and transmits the second light beam returned from the reflective prism 34 to the holographic beam splitter 32. The reflective prism 34 reflects the light beam incident from the second beam splitter 33 to the variable aperture 35, and the light beam incident from the variable aperture 35 is transmitted to the second beam splitter 33.

The variable aperture 35 transmits the first light beam of the 635 nm wavelength incident from the reflective prism 34 to the objective lens 36, and transmits only part of the second light beam of the 780 nm wavelength incident from the reflective prism 34 to the objective lens 36. Further specifically, the variable aperture 35 totally transmits the first light beam incident from the reflective prism 34 and passes the transmitted first light beam to the objective lens 36, and transmits only the second light beam incident to the region having the NA of 0.45 or below among the second light beam incident from the reflective prism 34 and passes the transmitted second light beam to the objective lens 36.

The objective lens 36 focuses the first light beam incident from the variable aperture 35 on the information recording surface of the DVD 8 having a thickness of 0.6 mm, and the second light beam incident from the variable aperture 35 on that of the CD-R 9 having a thickness of 1.2 mm. The variable aperture 35 defines the first light beam and the second light beam to different numerical apertures (NA).

Accordingly, when the DVD 8 is loaded on the optical disk driver, the first optical unit 200 performs photoemission and/or photo-detection operation with regard to the first light beam of the 635 nm wavelength, and the second optical unit 300 focuses the first light beam at a desired location of the DVD 8, travelling on a guide rail 100. Meanwhile, when the CD-R 9 is loaded on the optical disk driver, the second optical unit 300 performs photo-emission and/or photo-detection operation with regard to the CD-R 9 using the second light beam of the 780 nm wavelength, travelling on the guide rail 100. With regard to the recording of information, laser light having a wavelength of 780 nm is used for a CD-R, and laser light having a wavelength of 635 nm is used for a DVD-RAM.

As described above, the optical head assembly according to the embodiment of the present invention includes separately a first optical unit 200 for recording and reproduction of a DVD and a second optical unit 300 for recording and reproduction of a CD-R. The movable second optical unit 300 performs recording and reproduction with respect to the loaded disk 8 or 9, travelling on a guide rail 100. Accordingly, the optical head assembly can reduce the load of an actuator, thereby providing an advantage of decreasing a data access time and a target sector seek time.

While only a certain embodiment of the present invention have been specifically described herein, it will be apparent that numerous modifications may be made thereto without departing from the spirit and scope of the invention.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical head assembly for use in an optical disk driver using different wavelengths from each other for at least two types of optical disks, the optical head assembly comprising:

a first optical unit mounted fixedly in the optical head assembly; and a second optical unit mounted movably with respect to an optical disk loaded in the disk driver, wherein said first optical unit emits a first light beam having a first of the different wavelengths to said second optical unit and detects information from the first light beam reflected from the loaded optical disk and received from said second optical unit, if the loaded optical disk is a first of the at least two types of optical disks, and said second optical unit focuses the first light beam incident from said first optical unit on an information recording surface of the loaded optical disk and transmits the first light beam reflected from the loaded optical disk to said first optical unit, if the loaded optical disk is the first type of optical disk, generates a second light beam, focuses the second light beam on the information recording surface of the loaded optical disk and detects information from the second light beam reflected from the loaded optical disk, if the loaded optical disk is a second type of the at least two types of optical disks.

2. The optical head assembly according to claim 1, wherein said first optical unit transmits the first light beam in the form of a parallel light beam to said second optical unit.

3. The optical head assembly according to claim 1, wherein said first optical unit comprises:

a light source to emit the first light beam;

a photodetector to detect information from the first light beam;

optical path alteration means for transmitting the first light beam emitted from said light source toward said second optical unit, and reflecting the first light beam received from said second optical unit toward said photodetector; and a collimating lens to collimate the first light beam emitted from said first optical path alteration means to a parallel light beam and to transmit the parallel light beam to said second optical unit, and to transmit the first light beam received from said second optical unit toward said optical path alteration means.

4. The optical head assembly according to claim 3, wherein said optical path alteration means comprises:

a polarizing beam splitter to transmit the first light beam emitted from said light source to said collimating lens, and to reflect the first light beam incident from said collimating lens to said photodetector; and a phase plate positioned between said polarizing beam splitter and said collimating lens.

5. The optical head assembly according to claim 4, further comprising a beam forming optical element to beam-form the first light beam emitted from said light source and to transmit the beam-formed first light beam to said polarizing beam splitter.

6. The optical head assembly according to claim 1, wherein said second optical unit travels along a direction parallel to the first light beam emitted from said first optical unit.

7. The optical head assembly according to claim 1, wherein said second optical unit comprises:
   a light source to emit the second light beam;
   a photodetector to detect information from the second light beam;
   an objective lens to focus the first light beam transmitted from said first optical unit and the second light beam emitted from said light source on the information recording surface of the loaded first and second types of optical disks, respectively; and
   optical path alteration means to transmit the first light beam emitted from said first optical unit and the second light beam emitted from said second light source to said objective lens, the first light beam incident from said objective lens to said first optical unit, and the second light beam incident from said objective lens to said photodetector, respectively.

8. The optical head assembly according to claim 7, wherein said optical path alteration means comprises a beam splitter to transmit the first light beam incident from said first optical unit and to reflect the second light beam emitted from said light source.

9. The optical head assembly according to claim 7, further comprising a variable aperture, positioned between said optical path alteration means and said objective lens, to define the first light beam and the second light beam to different numerical apertures (NA).

10. The optical head assembly according to claim 7, further comprising a mirror to reflect the first and second light beams so that the first and second light beams emitted from said optical path alteration means proceed to said objective lens.

11. The optical head assembly according to claim 10, wherein said mirror reflects the first and second light beams at approximately right angles.

12. The optical head assembly according to claim 1, wherein the first type of optical disk is a digital versatile disk-random access memory (DVD-RAM) and the second type of optical disk is a recordable compact disk (CD-R), and the first light beam is used for recording information with respect to the DVD and the second light beam is used for recording information with respect to the CD-R.

13. An optical head assembly for use with an optical disk driver compatible with a first and second different types of optical disks, comprising:
   a first optical unit to emit a first light beam having a first frequency if the optical disk of the first type is loaded in the optical disk driver; and
   a second optical unit to emit a second light beam having a second frequency if the optical disk of the second type is loaded in the optical disk driver;
   wherein said second optical unit directs the first light beam from said first optical unit to the first type optical disk and directs the second light beam to the second type optical disk.

14. The optical head assembly as claimed in claim 13, wherein:
   said first optical unit is fixed in position in the optical head assembly; and
   and said second optical unit moves in a direction substantially parallel to the first light beam emitted from said first optical unit based upon which of the first and second types of optical disks is loaded in the optical disk driver.

15. The optical head assembly as claimed in claim 14, further comprising guide rails to engage and guide said second optical unit the direction substantially parallel to the first light beam emitted from said first optical unit.

16. The optical head assembly as claimed in claim 15, wherein the direction substantially parallel to the first light beam emitted from said first optical unit is coincident with the first and second type optical disks when the first and second type optical disks are loaded in the optical disk driver.

17. The optical head assembly as claimed in claim 14, further comprising:
   a variable aperture, formed between said second optical unit and the optical disk driver, to define the first and second light beams to different respective numerical apertures; and
   an objective lens, formed between said variable aperture and the optical disk driver, to focus the first light and second light beams defined by said variable aperture on the respective first and second type optical disks.

18. The optical head assembly as claimed in claim 17, wherein said variable aperture comprises:
   a first region to transmit the first light beam from said first optical unit and redirected by said second optical unit and to transmit the second light beam emitted by said second optical unit; and
   a second region surrounding said first region and transmitting only the first light beam from said first optical unit and redirected by said second optical unit.

19. The optical head assembly as claimed in claim 14, wherein:
   said first optical unit comprises
      a first light source to emit the first light beam,
      a first photodetector to detect the information from the first light beam reflected by the first type optical disk and directed by said second optical unit,
      a first path altering unit to direct the first light beam emitted from said light source to said second optical unit and to direct the first light beam reflected by the first type optical disk and directed by said second optical unit to said first photodetector, and
      a collimator to collimate the first light beam transmitted from said first path altering unit to a parallel light beam; and
   said second optical unit comprises
      a second light source to emit the second light beam,
      a second photodetector to detect the information from the second light beam reflected by the second type optical disk, and
      a second path altering unit to transmit the first light beam output by said collimator and the first light beam reflected by the first type optical disk, and to reflect the second light beam emitted by said second light source for transmission to the second type optical disk, and the second light beam reflected by the second type optical disk to said second photodetector.

20. The optical head assembly as claimed in claim 19, further comprising:
- a variable aperture, formed between said second optical unit and the optical disk driver, to define the first and second light beams to different respective numerical apertures; and
- an objective lens, formed between said variable aperture and the optical disk driver, to focus the first light and second light beams defined by said variable aperture on the respective first and second type optical disks.

21. The optical head assembly as claimed in claim 13, wherein said second optical unit directs the first light beam reflected from the first type optical disk to said first optical unit and detects information from the second light beam reflected from the second type optical disk, wherein said first optical unit detects information from the first light beam reflected by the first type optical disk and directed by said second optical unit.

22. The optical head assembly as claimed in claim 21, wherein said first optical unit comprises:
- a light source to emit the first light beam;
- a photodetector to detect the information from the first light beam reflected by the first type optical disk and directed by said second optical unit;
- a path altering unit to direct the first light beam emitted from said light source to said second optical unit and to direct the first light beam reflected by the first type optical disk and directed by said second optical unit to said photodetector; and
- a collimator to collimate the first light beam transmitted from said path altering unit to a parallel light beam.

23. The optical head assembly as claimed in claim 22, wherein:
- said light source emits said first light beam as a P polarization beam; and
- said first optical unit further comprises
  - a beam forming element formed between said light source and said path altering unit, to beam-form the first light beam emitted from said light source, and
  - a phase plate formed between said path altering unit and said collimator, to change the first light beam reflected from the first type optical disk and directed by said second optical unit from the P polarization beam to an S polarization beam.

24. The optical head assembly as claimed in claim 21, wherein said second optical unit comprises:
- a light source to emit the second light beam;
- a photodetector to detect the information from the second light beam reflected by the second type optical disk;
- a path altering unit to transmit the first light beam output by said first optical unit and the first light beam reflected by the first type optical disk, and to reflect the second light beam emitted by said light source for transmission to the second type optical disk, and the second light beam reflected by the second type optical disk to said photodetector.

25. The optical head assembly as claimed in claim 24, wherein said second optical unit further comprises a reflective element to reflect the first and second light beams from said path altering unit toward the respective first and second type optical disks.

26. The optical head assembly as claimed in claim 21, wherein:
- said first optical unit comprises
  - a first light source to emit the first light beam,
  - a first photodetector to detect the information from the first light beam reflected by the first type optical disk and directed by said second optical unit,
  - a first path altering unit to direct the first light beam emitted from said light source to said second optical unit and to direct the first light beam reflected by the first type optical disk and directed by said second optical unit to said first photodetector, and
  - a collimator to collimate the first light beam transmitted from said first path altering unit to a parallel light beam; and
- said second optical unit comprises
  - a second light source to emit the second light beam,
  - a second photodetector to detect the information from the second light beam reflected by the second type optical disk, and
  - a second path altering unit to transmit the first light beam output by said collimator and the first light beam reflected by the first type optical disk, and to reflect the second light beam emitted by said second light source for transmission to the second type optical disk, and the second light beam reflected by the second type optical disk to said second photodetector.

27. An optical head assembly for use with an optical disk driver compatible with first and second type optical disks, comprising:
- a first optical unit, fixed in position in the optical head assembly, to emit a first light beam having a first frequency if the optical disk of the first type is loaded in the optical disk driver;
- a second optical unit, movable in a direction substantially parallel to the first light beam output by said first optical unit, to emit a second light beam having a second frequency if the optical disk of the second type is loaded in the optical disk driver; and
- an objective lens, fixed in position in the optical head assembly;
- wherein said second optical unit directs the first light beam from said first optical unit to the said objective lens and directs the second light beam to said objective lens, wherein said objective lens focuses the first and second light beams on the respective first and second type optical disks.

28. The optical head assembly as claimed in claim 27, further comprising a variable aperture, formed between said second optical unit and said objective lens, to define the first and second light beams to different respective numerical apertures.

* * * * *